United States Patent [19]

Kuchar et al.

[11] 3,735,907
[45] May 29, 1973

[54] MACHINE FOR INTERMITTENTLY FEEDING ELONGATED ARTICLES

[75] Inventors: William E. Kuchar, Cherry Valley; Robert W. Mauk, Rockford, both of Ill.

[73] Assignee: W. A. Whitney Corp., Rockford, Ill.

[22] Filed: Jan. 20, 1972

[21] Appl. No.: 219,315

[52] U.S. Cl. .................226/150, 226/162, 83/277, 83/465, 83/458
[51] Int. Cl. ...........................................B65h 17/44
[58] Field of Search.....................226/150, 162, 145, 226/146; 83/277

[56] References Cited

UNITED STATES PATENTS 3,438,557   4/1969   Lehmann........................226/162 X
3,462,056   8/1969   Scribner..........................226/162 X Primary Examiner—Allen N. Knowles
Attorney—Wolfe, Hubbard, Leydig, Voit & Osann, Ltd.

[57] ABSTRACT

An elongated angle iron is fed lengthwise through successive intermittent strokes to a punch press by a movable carriage which supports a pair of upper and lower jaws operable to clamp the angle for movement with the carriage. The jaws are mounted to float vertically relative to one another so that each may grip the angle securely and then release the angle cleanly even if the angle is bowed intermediate its ends. During the feed stroke, the carriage is raised to lift the angle away from the die of the press and thereby avoid damage to the die.

8 Claims, 5 Drawing Figures

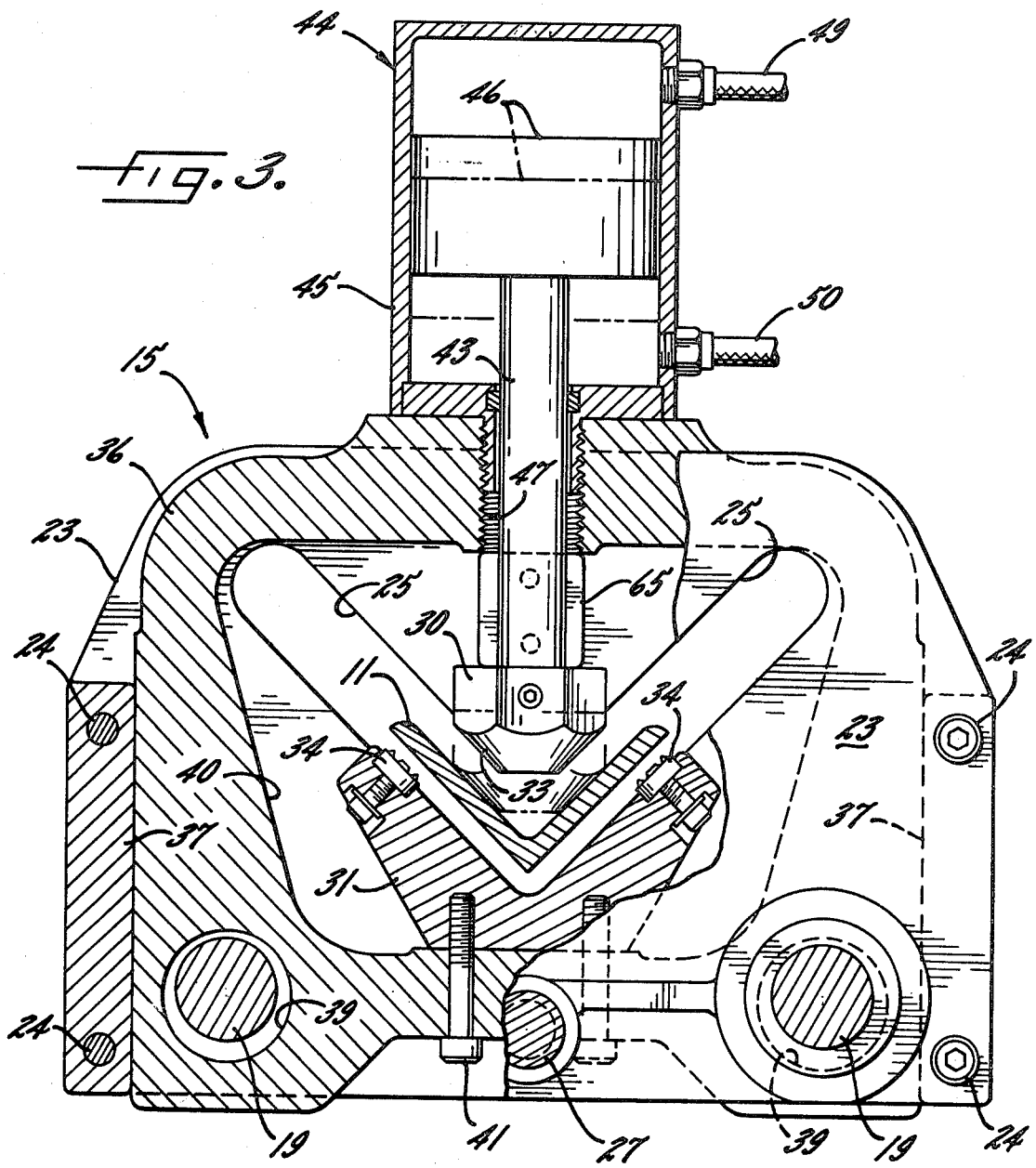

3,735,907

MACHINE FOR INTERMITTENTLY FEEDING ELONGATED ARTICLES

BACKGROUND OF THE INVENTION

This invention relates to a machine for feeding an elongated article lengthwise through successive intermittent strokes of predetermined length. More particularly, the invention relates to a machine for feeding an article such as a long angle iron to one or more machine tools such as a punch press and/or a shear having dies for performing cutting operations at spaced points along the angle. In such a machine, opposing jaws first clamp the angle for movement with a carriage which then is advanced to feed the angle across the dies. After the angle has been advanced and unclamped, the carriage returns the jaws reversely along the angle during performance of the cutting operation and preparatory to the next feed cycle.

SUMMARY OF THE INVENTION

The general aim of the present invention is to provide a new, improved and comparatively trouble-free article feeder of the above character which, when compared with prior feeders of the same general type, is capable of clamping the article more tightly and feeding the article through a stroke of more precise length even through the article is crooked, bowed or otherwise irregularly shaped.

A more detailed object is to achieve the foregoing through the provision of an article feeder in which the clamping jaws are mounted to float relative to one another and transversely of the article to enable both jaws to clamp the article securely and to release the article cleanly regardless of the transverse positioning of the article between the jaws.

A further object is to provide a novel workpiece feeder in which one jaw clamps against the article and thereafter automatically causes the other jaw to move into clamping engagement with the article so that the latter jaw may move to a position corresponding to the article and thereby obtain a tight grip on the article.

The invention also resides in the unique and comparatively simple arrangement for mounting the jaws for transverse floating and for actuating the jaws to cause one jaw to be moved between clamped and released positions automatically when the other jaw either engages the article or reaches its released position.

Still another object of the invention is to lift the article away from the tool dies during the feed stroke of the article so as to avoid damaging the dies, and then to lower the article onto the dies into position for performance of the cutting operation.

These and other objects and advantages of the invention will become more apparent from the following detailed description when taken in conjunction with the accompanying drawings.

BRIEF DESCRIPTION OF THE DRAWINGS

FIG. 3 is a fragmentary cross-section taken substantially along the line 3—3 of FIG. 2 and showing the jaws of the feeder released from the article.

DETAILED DESCRIPTION OF THE PREFERRED EMBODIMENT

Figure 1:
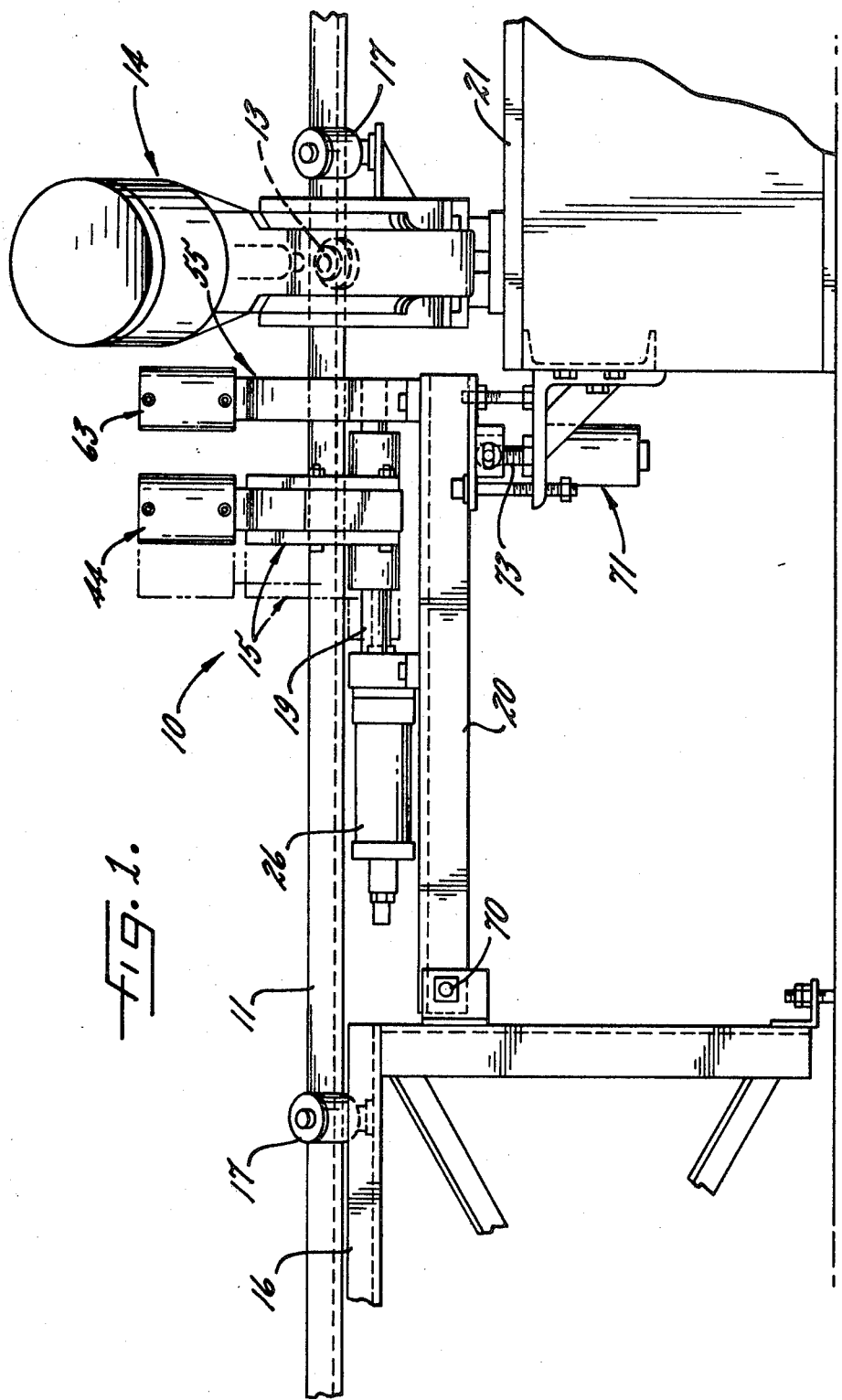
FIG. 1 is a side elevational view of an exemplary machine tool organization with which the new and improved article feeder of the present invention is adapted for use.

As shown in the drawings for purposes of illustration, the invention is embodied in a machine 10 for feeding an elongated article such as an angle iron 11 lengthwise and horizontally through successive intermittent strokes of predetermined length and across an underlying tool in the form of a die 13 (FIG. 1) which is incorporated in a punch press 14 located downstream of the feeder. When the angle 11 dwells, the press 14 punches a hole in one flange of the angle while a similar downstream press (not shown) punches a hole in the other flange. A shear (not shown) is located downstream of the second press and includes a coacting blade and die for cutting the punched angle into short lengths which form clip irons for connecting angles and other structural shapes. Thus, the feeder 10 is used in conjunction with a machine tool organization which performs cutting operations on the angle by punching and shearing the angle.

In the present instance, feeding of the angle 11 is effected by clamping the angle to a carriage 15 (FIGS. 1 to 3) which then advances toward the press 14 to shift the angle across the die 13 through a stroke of desired length, the upstream end of the angle being supported on a long stand 16 (FIG. 1) located upstream of the feeder 10 and being drawn across longitudinally spaced sets of guide rollers 17 on the stand during the feed stroke. Upon completion of the feed stroke, the angle is unclamped from the carriage and the latter is returned reversely along the angle and away from the press (as shown in phantom in FIG. 1) preparatory to the next feed stroke and while the punching and shearing operations are being performed.

Figure 2:
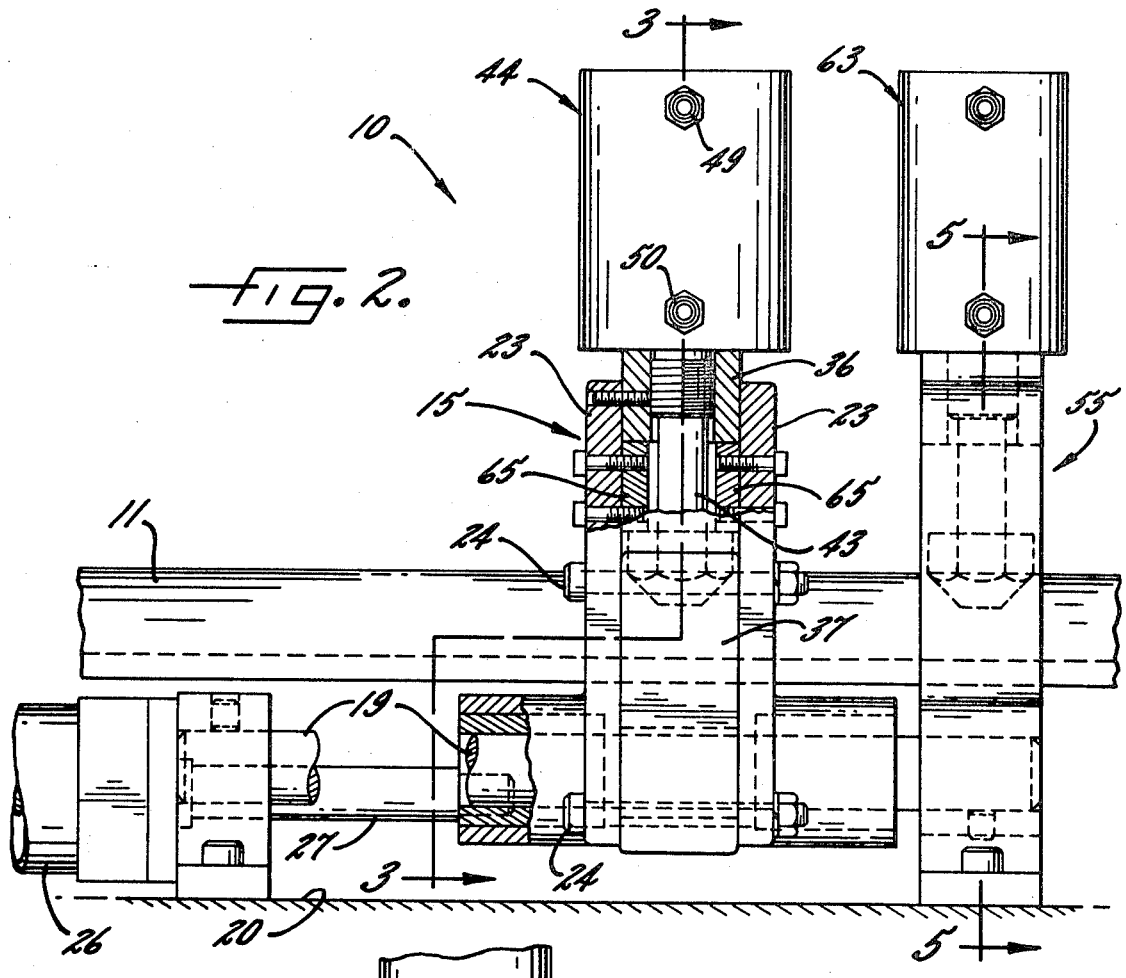
FIG. 2 is an enlarged side elevational view of the feeder shown in FIG. 1, parts being broken away and shown in section.

As shown in FIGS. 2 and 3, the carriage 15 is supported for movement through its feed and return strokes on a pair of horizontally extending ways or rods 19. The latter are mounted on a generally horizontal base 20 (FIG. 1) whose downstream end is supported on the bed 21 of the press 14 and whose upstream end is supported on the downstream end of the stand 16, the bed and the stand thus constituting a support for the base. Herein, the carriage comprises a pair of upright plates 23 (FIG. 2) spaced from one another along the rods 19 and fastened together by bolts 24. The plates are slidable along the rods and each is formed with a V-shaped slot 25 (FIG. 3) through which the angle 11 is adapted to be threaded. To shift the carriage 15 back and forth on the base 20 and along the rods 19, an adjustable-stroke fluid actuator 26 (FIG. 2) is mounted on the upstream end of the base between the rods and includes a reciprocable ram 27 connected to the upstream plate 23 as shown in FIG. 3.

In order to clamp the angle 11 to the carriage 15 for movement with the latter during the feed stroke, a clamping assembly formed by upper and lower jaws 30 and 31 (FIG. 3) is supported on and movable with the carriage. The jaws are disposed above and below the angle which, when disposed between the jaws, is positioned with its flanges flaring upwardly and outwardly so as to define an upwardly facing V. The upper jaw is formed with a downwardly tapering frusto-conical lower end 33 adapted to seat between the upper faces of the flanges while the lower jaw is shaped as an upwardly opening V to conform to and receive the lower faces of the flanges. Hardened metal cleats 34 are supported on the lower jaw and are adapted to bite into the angle to effect a secure grip on the angle during the feed stroke.

The angles 11 adapted to be handled by the feeder 10 initially are several feet long and often are bowed vertically or undulate upwardly and downwardly from end-to-end. Because the angle frequently is not straight, the successive portions of the angle presented between the jaws 30 and 31 for clamping usually are not located in the same vertical position relative to the jaws and are not located at a precise elevation. The irregularity of the angle thus makes it difficult to clamp the angle sufficiently tightly to effect feeding of the angle through a stroke of precise length.

In accordance with the primary aspect of the present invention, a tighter grip is secured on the angle 11 than has been possible heretofore by mounting the jaws 30 and 31 for vertical floating relative to one another on the carriage 15 so that each jaw may seek out and clamp tightly against the angle regardless of variations in the elevation of different portions of the angle due to the crookedness of the latter. In carrying out the invention, one jaw, herein the upper jaw 30, is forced downwardly into clamping engagement with the upper face of the angle and, automatically as an incident to such engagement, the lower jaw 31 floats upwardly and is drawn into tight clamping engagement with the lower face of the angle. Accordingly, a tight grip is effected on the angle by both jaws even though the angle is bowed or crooked and is not positioned at a precise elevation between the jaws. Slippage of the jaws on the angle thus is avoided to insure feeding of the angle through a precise increment.

More specifically, the jaws 30 and 31 are mounted for vertical floating on a slide 36 (FIG. 3) which is moveable upwardly and downwardly between the plates 23 of the carriage 15. As shown in FIG. 3, the slide 36 comprises a plate which is sandwiched between the plates 23 and which is guided at its sides for up and down sliding by a pair of blocks 37 located between the plates 23 and anchored to the latter by the bolts 24. At its lower end portion, the slide 36 is formed with a pair of horizontally spaced holes 39 which are enlarged and loosely receive the rods 19 to permit the slide to float vertically. The central portion of the slide is formed with an enlarged opening 40 through which the angle 11 is threaded, the lower jaw 31 being anchored to the bottom wall of the opening by screws 41.

Figure 4:
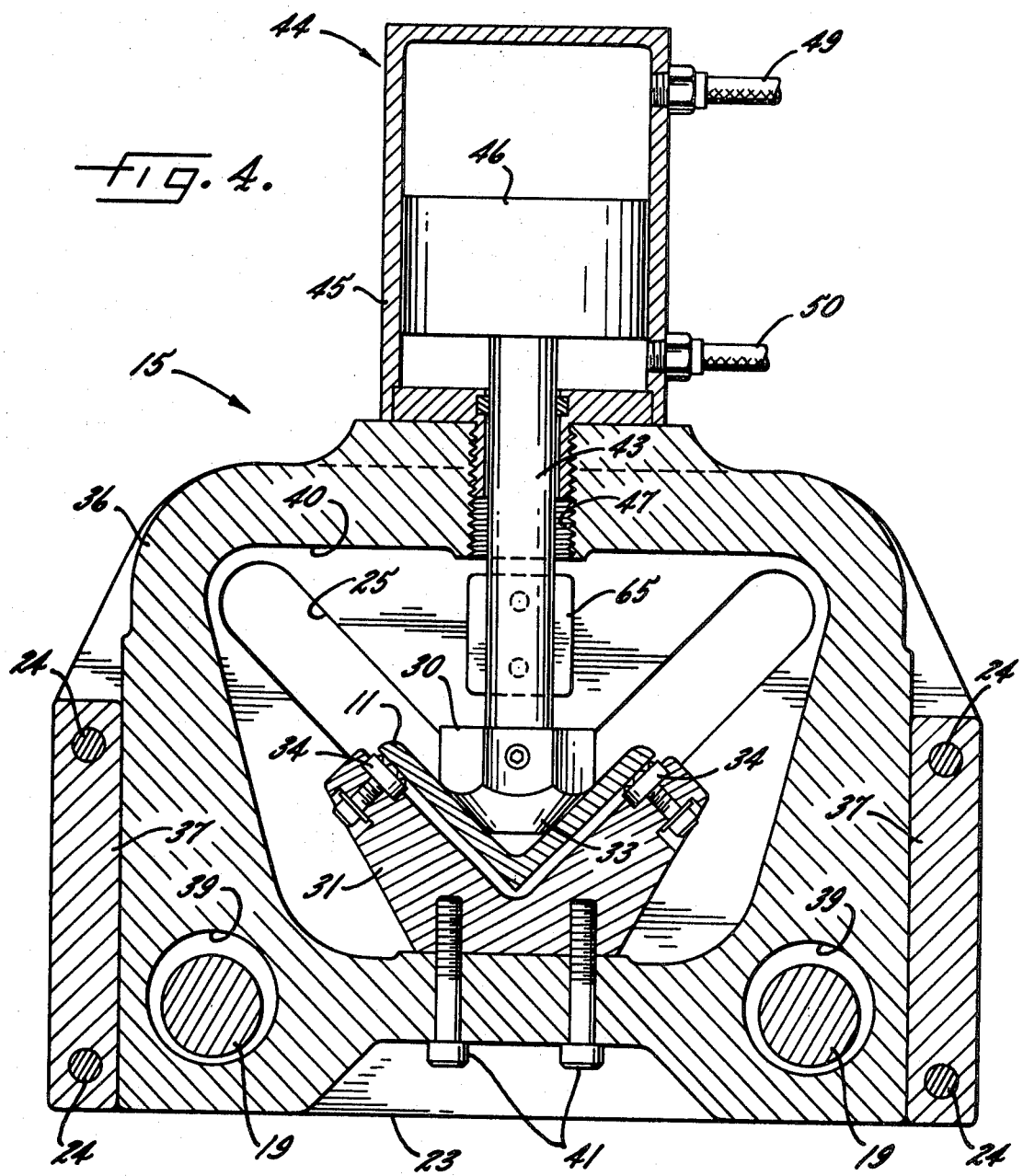
FIG. 4 is a view similar to FIG. 3 but showing the jaws clamped to the article.

The upper jaw 30 is carried on the lower end of the ram 43 (FIG. 3) of a fluid-operated actuator 44 which includes a cylinder 45 mounted rigidly on the upper side of the slide 36. A piston 46 is slidable upwardly and downwardly within the cylinder and is connected at its lower side to the ram 43, the latter projecting downwardly into the opening 40 through a hole 47 in the upper portion of the slide. As pressure fluid (e.g., pressurized air) is admitted alternately into the upper and lower ends of the cylinder through lines 49 and 50, respectively, the upper jaw 30 is reciprocated vertically between clamped and released positions with respect to the angle as shown in FIGS. 4 and 3, respectively.

Figure 5:
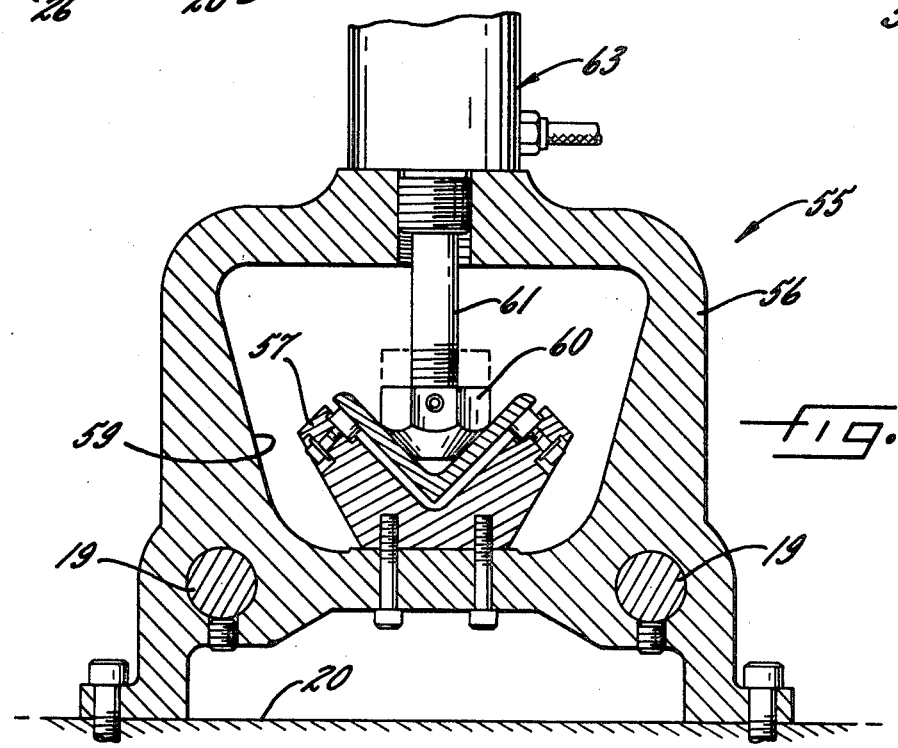
FIG. 5 is a fragmentary cross-section taken substantially along the line 5—5 of FIG. 2.

Prior to the beginning of each feed cycle and with the carriage 15 retracted, the upper jaw 30 is disposed in its released position shown in full in FIG. 3 and is spaced upwardly from the angle 11. At this time, the lower jaw 31 also is located in a released position (see FIG. 3) and normally is spaced just slightly below the angle. To clamp the angle, pressure fluid is admitted into the upper end of the cylinder 45 to extend the ram 43 downwardly out of the cylinder and thereby force the upper jaw downwardly into clamping engagement with the upper side of the angle as shown in phantom in FIG. 3. When the upper jaw engages the angle, further downward extension of the ram 43 is stopped since the angle is supported in a substantially rigid manner by the stand 16 and by a stationary clamping assembly 55 (shown in FIGS. 1 and 5 and to be described subsequently) located downstream of the feeder 10. The piston 46, however, is located substantially short of the bottom of the cylinder 45 when the ram 43 stops and thus, upon continued pressurization of the upper end of the cylinder, the latter is caused to slide upwardly on the ram. Being anchored rigidly to the slide 36, the cylinder 45 lifts the slide upwardly and draws the cleats 34 on the lower jaw 31 upwardly into tight biting engagement with the lower faces of the flanges of the angle 11 as shown in FIG. 4.

Accordingly, it will be apparent that the angle 11 is clamped tightly between the jaws 30 and 31 since the upper jaw is subjected to a downward force while the lower jaw is subjected to an upward force. If the angle is bowed or crooked and is not initially spaced equidistantly from the jaws, the lower jaw floats upwardly in response to the upper jaw engaging the angle and is drawn into tight gripping engagement with the lower faces of the flanges. Thus, a tight and substantially slip-free grip may be effected on all of the lengthwise increments of the angle even though the latter is bowed such that its various increments are not positioned at the same elevation relative to the jaws when located successively between the jaws.

After the angle 11 has been clamped, the carriage 15 is advanced by the actuator 26 to feed the angle to the press 14. At the completion of the feed stroke, the downstream end portion of the angle is clamped adjacent the press so as to hold the angle securely in place during punching while the carriage is being returned. For this purpose, the clamping assembly 55 (FIGS. 1 and 5) is mounted on the base 20 adjacent the downstream end of the feeder 10 and includes an upright plate 56 (FIG. 5) fixed rigidly to the rods 19 and supporting a stationary lower jaw 57 within an opening 59. An upper jaw 60 is carried on the lower end of the ram 61 of a fluid-operated actuator 63 on the upper side of the plate 56 and is adapted to be reciprocated between clamped and released positions with respect to the angle 11.

As soon as the angle 11 has been clamped by the jaws 57 and 60 at the end of the feed stroke, the jaws 30 and 31 are released to enable return of the carriage 15 along the angle. To release the jaws 30 and 31, pressure fluid is admitted into the lower end of the cylinder 45 to retract the ram 43 upwardly into the cylinder until the ram is stopped by virtue of the upper end of the upper jaw 31 engaging a pair of blocks 65 (FIGS. 2 and 4) anchored rigidly to the plates 23 of the carriage.

With the ram 43 stopped, continued pressurization of the lower end of the cylinder 45 causes the cylinder to slide downwardly on the ram to force the slide 36 downwardly and thereby positively pull the cleats 34 on the lower jaw 31 downwardly out of biting engagement with the angle. Accordingly, both jaws are released cleanly from the angle to allow the carriage to return freely. The actuator 26 then returns the carriage reversely along the angle into position to re-clamp the angle for the next feed stroke.

Advantageously, the angle 11 is lifted upwardly during each feed stroke to avoid dragging the angle across the die 13 of the punch press 14, and then is lowered upon completion of the feed stroke in order to place the angle on the die for punching. To these ends, the upstream end of the base 20 is pivoted on the stand 16 by a horizontal pivot pin 70 (FIG. 1) so as to permit upward and downward swinging of the base and the carriage 15. Such swinging is effected by a fluid-operated actuator 71 which is anchored to the bed 21 of the press 14 and whose ram 73 is pivotally attached to the downstream end of the base. After clamping of the jaws 30 and 31 and at the start of the feed stroke, the ram 73 is extended to swing the base 20 upwardly, thereby to lift the angle off of the die 13 and to hold the angle upwardly during the feed stroke so as to avoid damaging the die. At the completion of the feed stroke, the plunger 73 is retracted and positively pulls the base downwardly thereby to lower the angle and to seat the latter on the die for punching. The jaws 57 and 60 then clamp the angle to hold the latter during punching, the jaws 30 and 31 are released and the carriage 15 is returned to its starting position for another feed stroke. With the foregoing arrangement, the angle thus is raised and lowered to avoid damaging the die and yet the angle is clamped and controlled at all times by at least one set of jaws.

We claim as our invention:

1. A machine for feeding an elongated article lengthwise along a preselected path through successive intermittent strokes, said machine comprising a support, a carriage mounted on said support and movable forwardly and rearwardly along said path through advance and return strokes, a clamping assembly movable with said carriage and operable to advance the article with the carriage during said advance stroke and to leave the carriage free to move relative to the article during said return stroke, said clamping assembly comprising first and second jaws located on opposite sides of said article and movable transversely of said path between clamped positions in pressing engagement with the article and released positions out of pressing engagement with the article, and means for moving said first jaw toward its clamped position and operable to move said second jaw toward its clamped position automatically in response to said first jaw moving into pressing engagement with the article whereby both jaws tightly clamp the article regardless of the transverse position of the article.

2. A machine as defined in claim 1 in which said means also move said first jaw toward its released position and are operable to move said second jaw toward its released position automatically in response to said first jaw reaching its released position.

3. A machine as defined in claim 1 in which said clamping assembly further includes a slide guided on said carriage for transverse movement in the same direction as said jaws, said second jaw being carried on said slide, said means comprising a fluid-operated actuator having a cylinder mounted on and movable transversely with said slide, a ram slidable within said cylinder and carrying said first jaw, and means for admitting pressure fluid into one end of said cylinder to first advance said ram outwardly of said cylinder to place said first jaw in pressing engagement with said article and thereafter to shift said cylinder reversely on said ram to move said slide and shift said second jaw to said clamped position.

4. A machine as defined in claim 3 further including means for admitting pressure fluid into the opposite end of said cylinder to retract said ram into the cylinder and shift said first jaw toward said released position, and coacting means on said ram and said carriage and engageable upon retraction of the ram through a predetermined distance to stop further retraction of the ram and to cause said cylinder to shift reversely on the ram in response to the continued admission of pressure fluid into the opposite end of the cylinder thereby to move said slide and shift said second jaw to said released position.

5. A machine as defined in claim 1 further including a base supporting said carriage and mounted on said support for movement in a second path extending transversely of said one path, and means for moving said base in one direction along said second path after movement of said jaws to said clamped positions and for moving the base in the opposite direction along said second path prior to movement of said jaws to said released positions.

6. A machine for feeding an elongated article lengthwise through successive intermittent strokes and across an underlying tool for performing a cutting operation on the article, said machine comprising a support, a carriage movable lengthwise of the article and horizontally toward and away from the tool through advance and return strokes, a slide mounted to move horizontally with and to move up and down on said carriage, a lower clamping jaw carried on and movable with said slide, a fluid-operated actuator having a cylinder mounted on and movable upwardly and downwardly with said slide, a ram slidable upwardly and downwardly within said cylinder, an upper clamping jaw mounted on and movable with the lower end of said ram and positioned above said lower jaw, means for admitting pressure fluid into the upper end of said cylinder to advance said ram downwardly out of the cylinder and lower said upper jaw into clamping engagement with said article and thereafter to shift said cylinder upwardly on the ram to lift said slide and pull said lower jaw upwardly into clamping engagement with the article, means for admitting pressure fluid into the lower end of said cylinder to retract said ram upwardly into said cylinder and lift said upper jaw out of clamping engagement with the article, and coacting means on said ram and said carriage and engageable upon retraction of the ram through a predetermined distance to stop further retraction of the ram and to cause said cylinder to shift downwardly on the ram in response to the continued admission of pressure fluid into the lower end of the cylinder thereby to lower said slide and shaft said lower jaw downwardly out of clamping engagement with the article.

7. A machine as defined in claim 6 further including a base supporting said carriage and mounted on said support for up and down movement, and means for raising said base upwardly after movement of said jaws into clamping engagement with the article thereby to keep the article lifted away from said tool during said advance stroke, and said means being operable to cause lowering of said base after movement of said jaws out of clamping engagement with the workpiece and prior to the return stroke of said carriage thereby to lower the article onto said tool and enable performance of said cutting operation during said return stroke.

8. A machine as defined in claim 7 further including a clamp located between said carriage and said cutting tool and movable upwardly and downwardly with said base, said clamp being operable to engage said article after completion of said advance stroke and to hold the article securely on the base during performance of said cutting operation.

* * * * *